United States Patent [19]
Whalen et al.

[11] Patent Number: 5,887,664
[45] Date of Patent: Mar. 30, 1999

[54] ADJUSTABLE DEPTH CONTROL MECHANISM FOR EARTH-PENETRATING DISK

[75] Inventors: Patrick Thomas Whalen; Ronald Eugene Chenoweth, both of Colchester, Ill.

[73] Assignee: Yetter Manufacturing Company, Colchester, Ill.

[21] Appl. No.: 889,397

[22] Filed: Jul. 8, 1997

[51] Int. Cl.[6] .................................................... A01C 5/06
[52] U.S. Cl. ........................ 172/430; 172/519; 111/135; 111/167; 111/926; 403/87; 403/92; 403/108; 403/322
[58] Field of Search ..................... 172/519, 536, 172/538, 430, 602; 111/135, 137, 140, 163, 164, 165, 167, 192, 193, 926; 403/3, 4, 408.1, 322, 376, 71, 81, 87, 92, 100, 101, 108

[56] References Cited

U.S. PATENT DOCUMENTS

| | | |
|---|---|---|
| 2,023,053 | 12/1935 | Kugel . |
| 2,120,331 | 6/1938 | Huxley ...................................... 111/84 |
| 2,332,012 | 10/1943 | Rasmussen . |
| 2,654,339 | 10/1953 | Sperling . |
| 3,433,309 | 3/1969 | Michaelis et al. ....................... 172/430 |
| 4,196,679 | 4/1980 | Moore .................................. 111/926 X |
| 4,207,823 | 6/1980 | Steilen et al. . |
| 4,331,205 | 5/1982 | Sorenson et al. ........................ 172/538 |
| 4,373,456 | 2/1983 | Westerfield . |
| 4,374,500 | 2/1983 | Westerfield . |
| 4,408,551 | 10/1983 | Keller et al. ......................... 172/536 X |
| 4,423,788 | 1/1984 | Robinson, Jr. et al. ................. 172/427 |
| 4,461,355 | 7/1984 | Peterson et al. ......................... 172/156 |
| 4,493,274 | 1/1985 | Robinson, Jr. et al. . |
| 4,520,742 | 6/1985 | Anderson . |
| 4,550,122 | 10/1985 | David et al. ............................. 172/158 |
| 4,607,705 | 8/1986 | Tebben ................................... 172/430 |
| 4,650,005 | 3/1987 | Tebben ................................... 172/430 |
| 4,712,492 | 12/1987 | Murray . |
| 4,733,730 | 3/1988 | Murray .................................... 172/519 |
| 4,760,806 | 8/1988 | Bigbee et al. . |
| 4,796,550 | 1/1989 | Van Natta et al. .................. 172/536 X |
| 4,986,200 | 1/1991 | Johnston ................................. 111/135 |
| 5,074,227 | 12/1991 | Schwitters ........................... 111/926 X |
| 5,081,942 | 1/1992 | Clark et al. .......................... 111/926 X |
| 5,394,946 | 3/1995 | Clifton et al. ....................... 172/536 X |
| 5,427,038 | 6/1995 | Ege ......................................... 111/137 |
| 5,497,716 | 3/1996 | Shoup .................................. 111/926 X |
| 5,609,114 | 3/1997 | Barton ..................................... 111/167 |

*Primary Examiner*—Christopher J. Novosad
*Attorney, Agent, or Firm*—Lee, Mann, Smith, McWilliams, Sweeney & Ohlson

[57] ABSTRACT

An adjustable depth control mechanism for use with earth penetrating equipment. The invention includes a hub and spindle assembly for use with an adjustable depth gauge wheel, which is mounted on a support axle. It may also include a position indicator that an operator can readily view to determine the relative position of the depth gauge wheel and, accordingly, the depth setting of the ground penetrating disc. The indicator rotates to certain positions that correspond to the depth to which the disc is allowed to penetrate into the ground. Preferably, both the position indicator and the adjustment mechanism of the assembly are located internal to the depth gauge wheel and are covered and protected by the rim of the wheel from contamination by soil and crop residue.

13 Claims, 3 Drawing Sheets

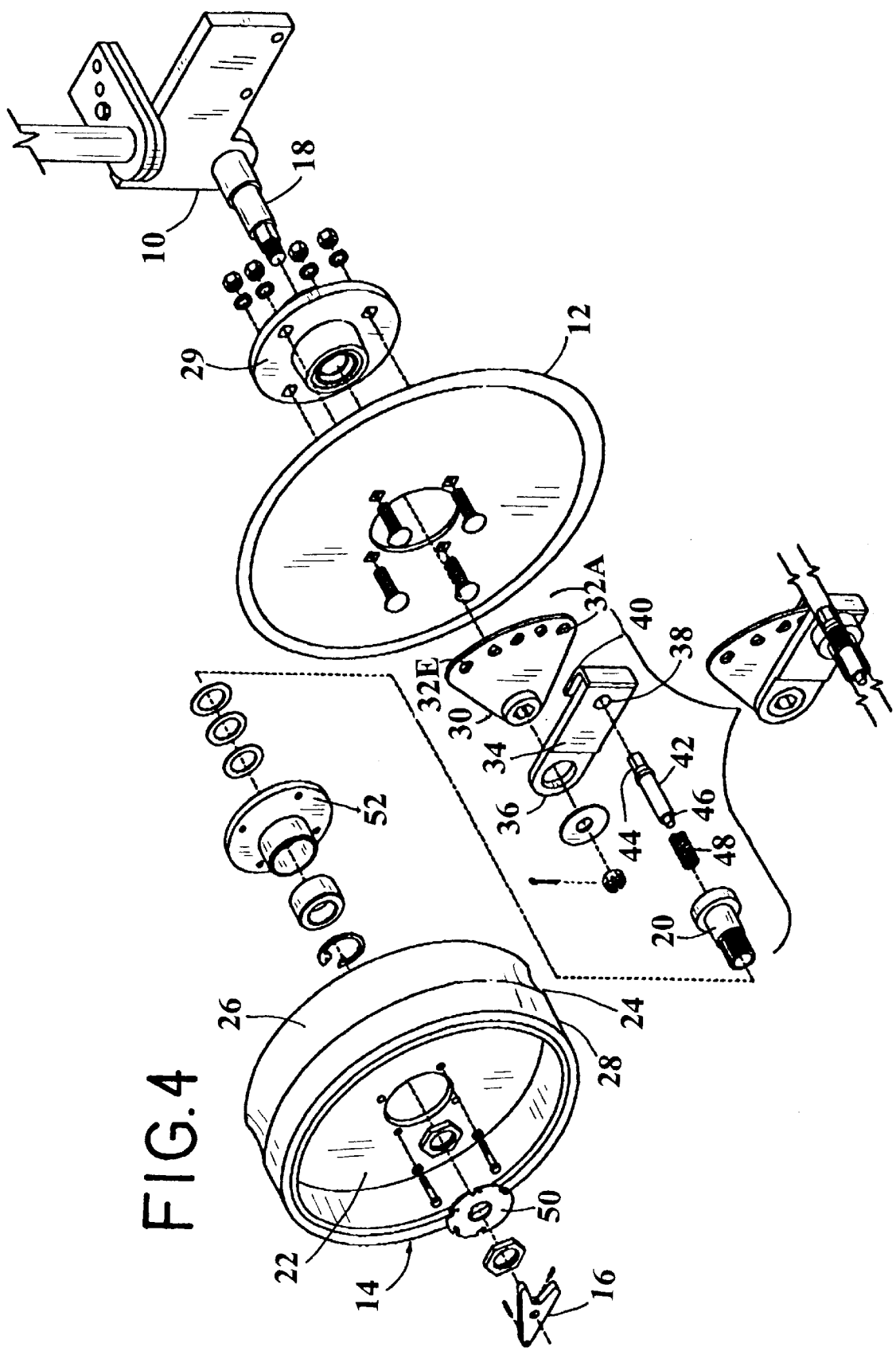

ADJUSTABLE DEPTH CONTROL MECHANISM FOR EARTH-PENETRATING DISK

BACKGROUND OF THE INVENTION

The present invention relates to an adjustable depth control mechanism for use with a coulter disc assembly, farming implement, trencher, or other earth-penetrating equipment. More specifically, the invention is directed toward a hub and spindle assembly with a position indicator for use with an adjustable depth gauge wheel.

Farming implements are used for working the ground, and often the depth of the furrow is significant for seeding or fertilizing. Similarly, in other applications, depth may be important such as burying cable. Prior art techniques for controlling the depth of penetration of a coulter disc have used position indicating attachments and indicators with depth gauge wheels so that the operator can determine the depth of the furrow.

The prior art includes Bigbee et al. 4,760,806 patent, which shows a depth control device for adjusting a gauge wheel relative to a disk blade that includes a wheel support arm fixed to one end of the disk blade spindle and an apertured quadrant fixed to the opposite end of the spindle for adjusting the arm that attaches to the depth control wheel assembly. A depth control wheel is mounted on the arm on a different axis from the coulter disk. In Bigbee, the adjustment mechanism is externally located where it is exposed to crop residue and trash, which can jam the mechanism and prevent efficient operation thereof. The control handle is on a separate arm than the gauge wheel.

It has therefore been found beneficial to produce an assembly that selectively changes the orientation between the coulter disk and the depth gauge wheel using an adjustment mechanism that is internally located within the protection afforded by the depth gauge wheel, thereby being covered and protected from crop residue and trash.

SUMMARY OF THE INVENTION

The invention may be described as an adjustable depth control mechanism for use with a coulter disc assembly which is mounted on a support axle for a coulter disc. It has a depth gauge wheel that preferably encloses a hub and spindle assembly that has a spindle shaft and adjustment pin that support the depth gauge wheel. It may also include a position indicator, which is preferably shaped like the tip of an arrow, that an operator can readily view to determine the relative position of the depth gauge wheel and, accordingly, the depth setting of the coulter disc. The indicator rotates to certain positions that correspond to the depth to which the coulter disc is allowed to penetrate into the ground. The position indicator is attached to an adjustment pin that passes through the spindle shaft and which preferably has a "D" shaped end that is opposite the indicator. The "D" shaped end inserts into an adjustment plate that has several "D" shaped apertures that are aligned in an arch and vary at predetermined angles (preferably 60 degrees) as the adjustment pin is moved to the next aperture. The "D" shaped apertures, at different angles, force the "D" shaped end of the adjustment pin to be in a different rotative position corresponding to each aperture. The rotation of the adjustment pin forces the indicator to point to numbered points that correspond to the depth setting of the coulter disc. The position indicator preferably serves as the selector for adjusting the depth gauge wheel relative to the coulter disc, as well as readily indicating the position of the wheel with respect to the disc. This allows for a quick look at the position indicator to determine the depth that the coulter disc penetrates the earth.

The other end of the adjustment plate is attached to the coulter disc support axle that is centered through the coulter disc. Only a single position adjustment arm is needed. In the preferred embodiment, both the position indicator and the adjustment mechanism are located internal to the depth gauge wheel and are covered and protected by the rim of the wheel from contamination by soil and crop residue. Also, the spindle shaft supports a depth gauge wheel, which adjusts the depth of earth penetration of the coulter. The depth gauge wheel rolls on the earth's surface, and the distance that the coulter disc extends below the depth gauge wheel is the depth that the coulter disc penetrates the ground.

BRIEF DESCRIPTION OF THE DRAWINGS

FIG. 4 is also an exploded perspective view showing a modified embodiment of the depth control mechanism having a depth gauge wheel and coulter disc;

DETAILED DESCRIPTION OF THE INVENTION

Figure 1:
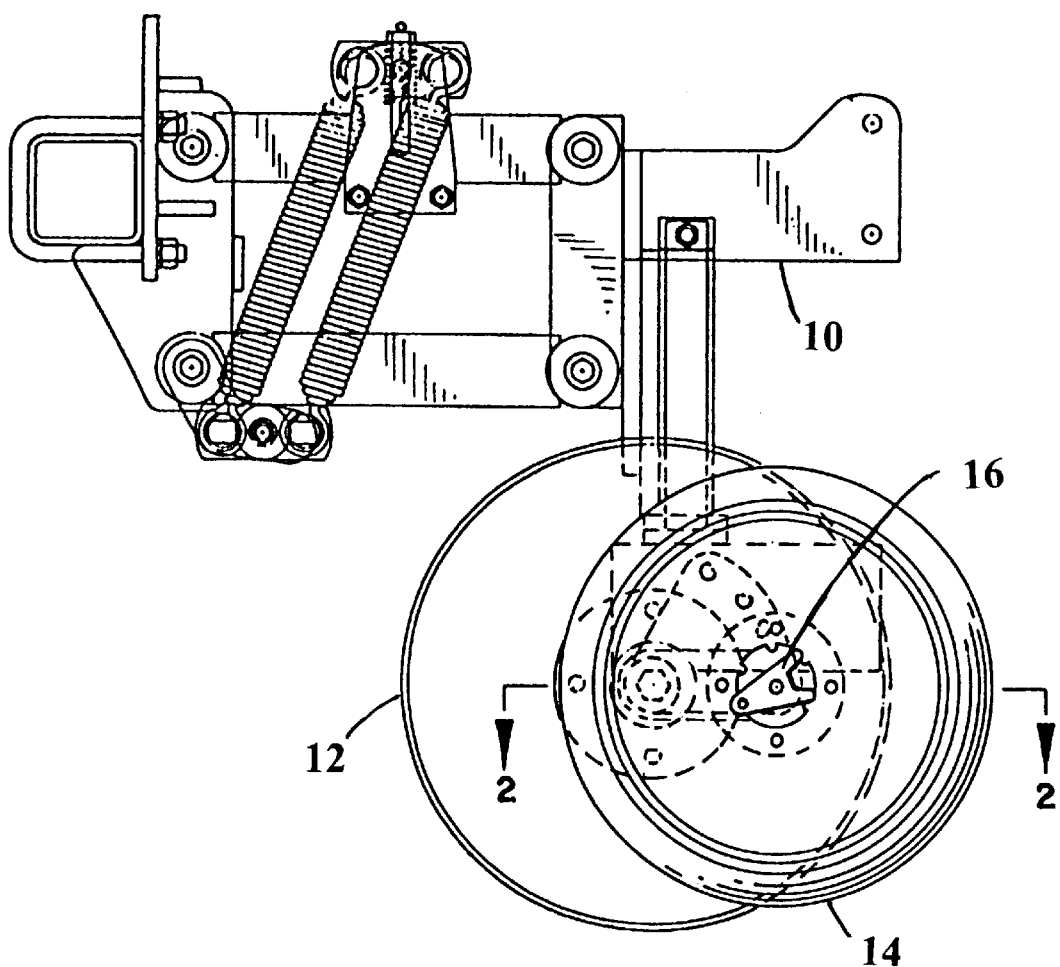
FIG. 1 shows a side view of the depth control mechanism as attached to the frame of an earth-penetrating piece of equipment.

FIG. 1 shows an adjustable depth control mechanism attached to frame 10 of an earth-penetrating piece of equipment to which is attached a coulter disc 12. Although the preferred embodiment of the invention is illustrated and described in connection with a coulter disc assembly, it can be adapted for use with a wide variety of devices that are adapted to penetrate the ground to a predetermined but variable depth. A depth gauge wheel 14 is provided to control the depth of penetration of the coulter disc 12 into the ground. Also, shown centered in depth gauge wheel 14 is the adjustment handle 16, which preferably functions as a position indicator. As a position indicator, handle 16 indicates the position of the depth gauge wheel 14 relative to the coulter disc 12 thereby indicating the depth of desired ground penetration. The handle 16 could be configured in any of a wide variety of shapes and sizes so long as it allows an operator to conveniently grasp it and move it.

Figure 2:
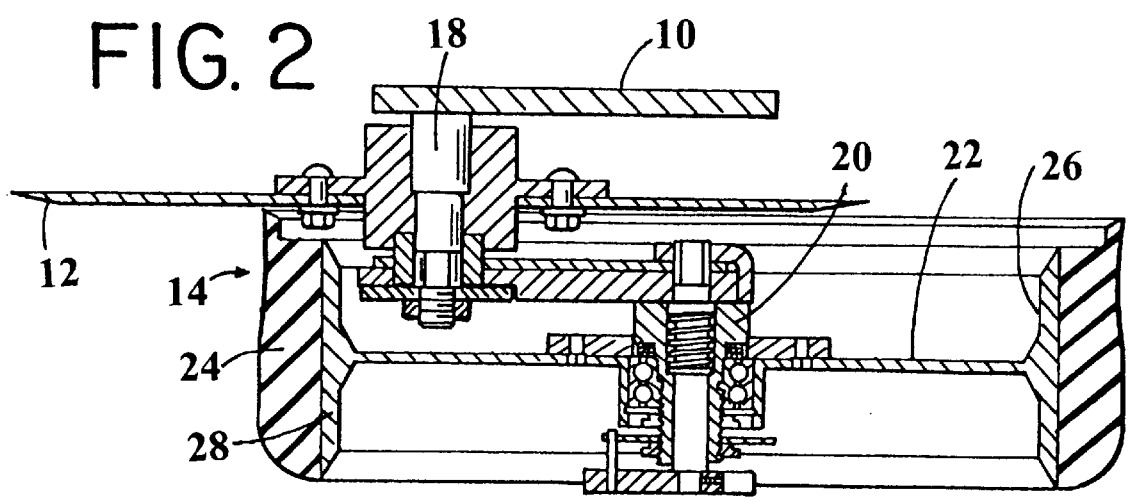
FIG. 2 shows a cross sectional view as taken along Line 2—2 in FIG. 1.

FIG. 2 shows the coulter disc 12 rotatably mounted on a support axle 18 that is attached to and extends from frame 10. Depth gauge wheel 14 is mounted for relative rotation about a spindle shaft 20. The spindle shaft 20 extends parallel to and is laterally spaced from the support axle 18. Depth gauge wheel 14 preferably defines a central radially extending wall 22 and a wheel rim 24 having a first flange member 26 and a second flange member 28 laterally extending in opposite directions from the central wall 22. The wall 22 and flange members 26 and 28 of the depth gauge wheel form an "I" shaped cross section as best shown in FIG. 2.

Figure 3:
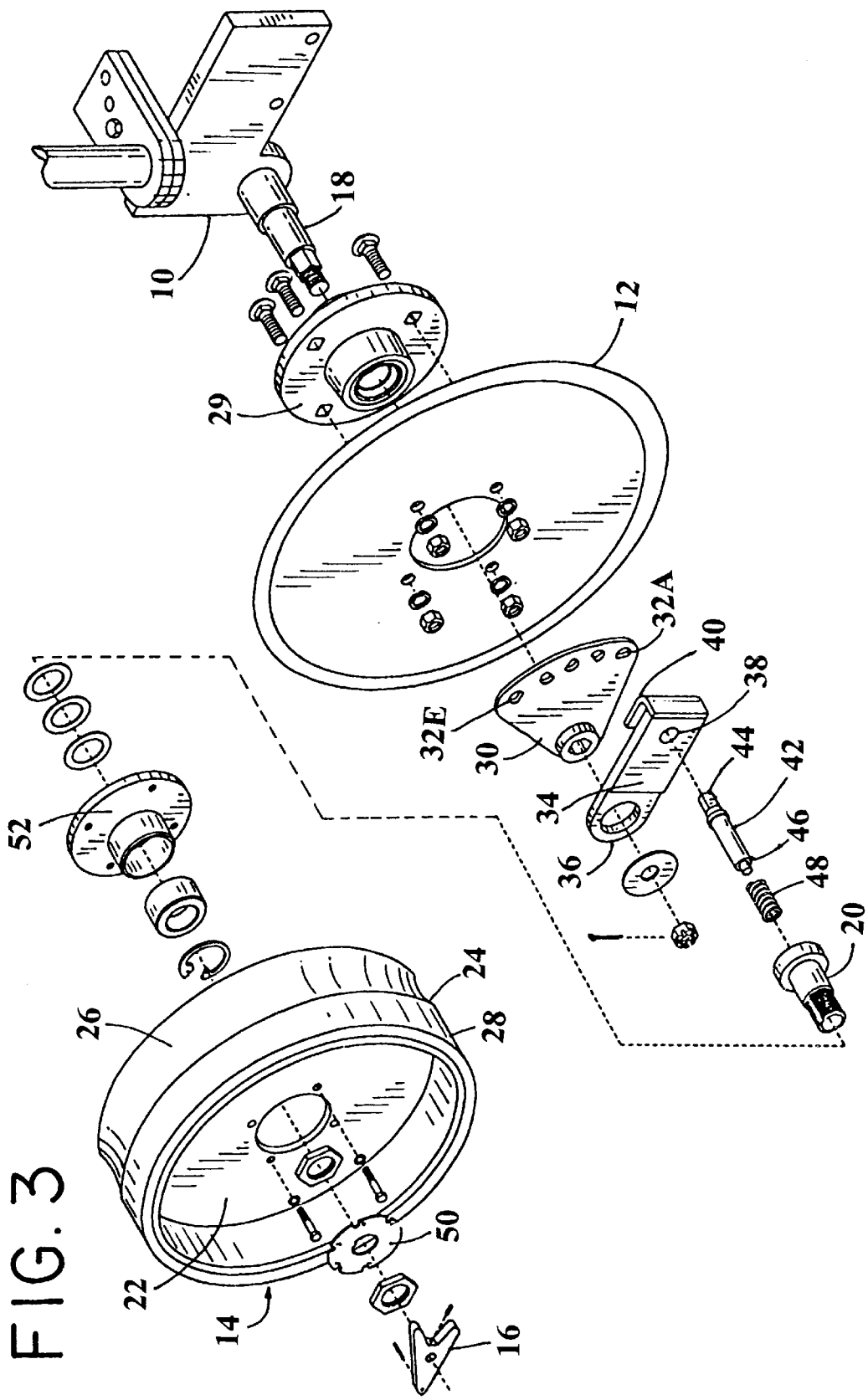
FIG. 3 is an exploded perspective view showing the depth control mechanism having a depth gauge wheel and a coulter disc mounted as it would be attached to the frame of an earth-penetrating piece of equipment.

FIG. 3 shows an exploded view of the preferred embodiment. Support axle 18 extends from frame 10. Support axle 18 may extend outward as shown or may be fixed by any means to the frame 10. Coulter disc 12 is rotatably mounted on the support axle 18 by means of a hub 29 in a manner that is conventional in the art. The axle 18 is illustrated as being stepped and its outer end extends through the hub 29 and the central aperture defined in the coulter 12.

FIG. 4 shows a slightly modified embodiment of the invention in which the bolts and nuts that secure the disc 12 to the hub 29 are reversed from the direction shown in FIG. 3.

An adjustment plate 30 is mounted on the support axle 18 in non-rotatable relation thereto. The adjustment plate 30 is preferably in the shape of a quadrant. The adjustment plate 30 defines a plurality of apertures 32A–32E therein. The apertures 32 A–E are positioned along an outer edge of the adjustment plate such that the centers of the apertures lie along an arc, the central axis of which is the axis of axle 18. Apertures 32A–32E are preferably non-circular, and ideally in a "D" shape. The preferred non-circular apertures 32A–32E vary with respect to each other at a predetermined angle. The predetermined angle is sufficient so that the position indicator 16 can be readily viewed to determine the setting of the relative position of the depth gauge wheel 14 with respect to the coulter disc 12. It is preferred to be between 30 degrees (30°) and 90 degrees (90°). Although the apertures 32A–32E are illustrated and described herein as being preferably of "D" shape, any of a number of other shapes could be utilized consistent with the purposes of the invention.

A position adjustment arm 34 is also mounted on the support axle 18 and is rotatable relative thereto at end 36. The position adjustment arm 34 has a pin receiving hole 38 formed there-through. The pin receiving hole 38 is adapted to align with any of the apertures 32 A–E of the adjustment plate 30. Apertures 32 A–E form an arc determined by the distance from the support axle 18 to the pin receiving hole 38 of the position adjustment arm 34. The end of the arm 34 having the pin receiving hole 38 preferably has a "U" shaped bracket 40 adapted to overlie the adjustment plate 30.

An adjustment pin 42 passes through the pin receiving hole 38 in the position adjustment arm 34 and is adapted to engage any one of the apertures 32 A–E in the adjustment plate 30. Pin 42 has an end 44 that is shaped to correspond with the shape of the aperture 32. In the preferred embodiment, the end 44 is "D" shaped, which engages the selected "D" shaped aperture 32 in the adjustment plate 30. Pin 42 has a second end 46 opposite the end 44.

The spindle shaft 20 is concentric with the adjustment pin 42, and adjustment pin 42 passes through the hollow center of the spindle shaft 20, preferably biased with a spring 48.

The position indicator 16 is attached to the second end 46 of the adjustment pin 42. The indicator 16 displays the orientation between the coulter disc 12 and the depth gauge wheel 14. Preferably handle 16 also serves as the means for indicating the relative position of the depth gauge wheel 14 relative to the coulter disc 12. A numbered plate 50 is mounted behind the position indicator 16 for readily displaying the orientation between the coulter disc 12 and the depth gauge wheel 14.

Preferably the adjustment plate 30 and adjustment arm 34 are mounted adjacent to the central wall 22 and are covered and protected by the flange member 26. Also, it is preferred to have the handle/position indicator 16 located adjacent the wall 22 internal to the depth gauge wheel and covered and protected by the rim 24 of the depth gauge wheel 14. The depth gauge wheel 14 is mounted for rotation about the spindle 20 by means of a hub 52 and suitable bearing arrangements well known to one of ordinary skill in the art.

The adjustable depth control mechanism is operated when the user decides to selectively change the relative orientation between the coulter disc 12 and the depth gauge wheel 14 to vary the depth of penetration of the coulter disc 12 or other ground penetrating device into the ground. The operator pulls the handle/position indicator 16 away from the wall 22. This removes the end 44 of the pin 42 from the aperture 32 in which it was positioned. The arm 34 and depth gauge wheel 14 are then rotated about the axis of the support axle 18 until the hole 38 is aligned with the desired aperture 32 of the plate 30 to effect the desired ground penetration of the disc 12. The position indicator 16 is then rotated until the "D" shaped end 44 of the pin 42 aligns with the "D" shape of the selected aperture 32 A–E. The position indicator 16 is then released, the pin end 44 enters the selected aperture 32 and the unit is locked for operation. Each change of the adjustment arm 34 with respect to the plate 30 effects a relative change of position between the gauge wheel 14 and the coulter disc 12 and changes the permitted depth of penetration of the coulter disc 12 into the ground. The arrow apex of the indicator 16 points to a position setting on plate 50 corresponding to a predetermined depth penetration level. The depth gauge wheel 14 is then locked in the desired position.

Other embodiments and equivalent systems, apparatuses and methods are envisioned within the scope of the invention. Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A hub and spindle assembly adapted to be mounted on a support axle of an earth-penetrating piece of equipment having a generally "I" shaped in cross-sectional depth gauge wheel and a disc through which the support axle passes, said assembly comprising:

an adjustment plate having a plurality of non-circular apertures, said plate being adapted for mounting on the support axle in non-rotatable relation;

a position adjustment arm adapted for mounting on the support axle and relatively rotatable with respect thereto; said arm having a first end with a pin receiving hole adapted to be aligned with any of said apertures in said adjustment plate;

a spindle shaft parallel to and laterally spaced from the support axle;

an adjustment pin having a first non-circular end, adapted to be positioned in one of said apertures in said adjustment plate, and a second end, said pin being concentric with said spindle shaft and passing through the spindle shaft;

a means for indicating the relative position of the depth gauge wheel relative to the disc, said means for indicating position being attached to said second end of said adjustment pin.

2. The hub and spindle assembly of claim 1, wherein the plurality of non-circular apertures in the adjustment plate form an arc determined by the distance from the support axle to the pin receiving hole of the position adjustment arm.

3. The hub and spindle assembly of claim 2, wherein the non-circular apertures vary with respect to each other at a predetermined angle.

4. The hub and spindle assembly of claim 3, wherein the predetermined angle is between 30 degrees (30°) and 90 degrees (90°).

5. The hub and spindle assembly of claim 3, wherein the non-circular apertures are "D" shaped and the non-circular end of the adjustment pin is "D" shaped.

6. The hub and spindle assembly of claim 2, wherein said hub and spindle assembly is internally located in space defined by the "I" shaped in cross-section depth gauge wheel.

7. An adjustable depth control mechanism for a disc that selectively changes the relative orientation between a disc and a depth gauge wheel to control the depth of penetration of the disc into the ground, said mechanism comprising:

a support axle;

a disc rotatably mounted on said support axle;

an adjustment plate defining a plurality of non-circular apertures therein; said plate mounted on said support axle in non-rotatable relation thereto;

a position adjustment arm having a pin receiving hole formed there through; said pin receiving hole adapted to align with said non-circular apertures; said arm being mounted on said support axle and relatively rotatable with respect thereto;

an adjustment pin having a non-circular end that passes through said pin receiving hole in said position adjustment arm and engages one of the non-circular apertures in said adjustment plate and having a second end opposite the non-circular end;

a spindle shaft parallel to and laterally spaced from said support axle; said spindle shaft concentric with said adjustment pin;

a depth gauge wheel rotatably mounted on said spindle shaft; said wheel defining a central radially extending wall and a wheel rim having first and second flange members laterally extending in opposite directions from said central wall, whereby said adjustment plate and said position adjustment arm are mounted adjacent to said central wall and are covered and protected by one of said flange members;

a handle attached to said adjustment pin for adjusting the orientation between said disc and said depth gauge wheel.

8. The depth control mechanism of claim 7 wherein said handle is a position indicator; said position indicator indicating the position of said depth gauge wheel relative to said disc thereby indicating the depth of desired ground penetration.

9. The depth control mechanism of claim 8 including a plate mounted behind the position indicator for readily determining the orientation between the disc and the depth gauge wheel.

10. The depth control mechanism of claim 8, wherein said non-circular apertures in said adjustment plate vary with respect to each other at a predetermined angle causing the orientation of the position indicator to vary at the same angles.

11. The depth control mechanism of claim 8 in which said position indicator is mounted adjacent said central wall and is covered and protected by one of said flange members.

12. An adjustable depth control mechanism for a ground penetrating assembly including:

a support axle adapted to be connected to a frame;

a ground penetrating disc rotatably mounted on said support axle;

a position adjustment arm mounted on said support axle and rotatable relative thereto;

a spindle shaft extending from said position adjustment arm parallel to, but laterally displaced from said support axle;

a depth gauge wheel rotatably mounted on said spindle shaft;

an adjustment plate mounted on said support axle and non-rotatable with respect thereto defining a plurality of apertures therein;

an adjustment pin engagable with any of said apertures in said adjustment plate and extending through said position adjustment arm, said position adjustment arm being movable with respect to said adjustment plate;

position indicator means connected to said adjustment pin for linear and rotational movement thereof;

whereby relative movement of said position adjustment arm with respect to said adjustment plate effects a change in position of said depth gauge wheel relative to said disc thereby changing the permitted depth of penetration of said disc.

13. The adjustable depth control mechanism of claim 12 wherein said position indicator means is mounted internal to said depth gauge wheel for protection thereof; and whereby said position indicator means enables a disc operator to visually review the relative depth adjustment position of said depth gauge wheel.

\* \* \* \* \*